United States Patent [19]

Berghof et al.

[11] 4,149,205
[45] Apr. 10, 1979

[54] MAGNETIC HEAD AND PROCESS FOR MAKING LAMINATED MAGNETIC HEAD

[75] Inventors: Winfried Berghof, Taufkirchen; Alfred Pichler, Munich; Rainer Raeth, Taufkirchen, all Fed. Rep. of Germany

[73] Assignee: Siemens Aktiengesellschaft, Berlin & Munich, Fed. Rep. of Germany

[21] Appl. No.: 853,389

[22] Filed: Nov. 21, 1977

[30] Foreign Application Priority Data

May 12, 1977 [DE] Fed. Rep. of Germany ....... 2721452

[51] Int. Cl.² ............................................. G11B 5/20
[52] U.S. Cl. .................................... 360/123; 360/126
[58] Field of Search ............................... 360/121–123, 360/125, 126, 119

[56] References Cited

U.S. PATENT DOCUMENTS

| 3,375,574 | 4/1968 | Woods et al. | 360/122 X |
| 3,549,825 | 12/1970 | Trimble | 360/123 |
| 3,657,806 | 4/1972 | Simon | 29/603 |
| 3,662,119 | 5/1972 | Romankiw et al. | 360/126 |
| 3,846,841 | 11/1974 | Lazzari et al. | 360/121 |
| 4,044,394 | 8/1977 | Hanazona et al. | 360/121 X |
| 4,052,749 | 10/1977 | Nomura et al. | 360/126 X |

Primary Examiner—John H. Wolff
Attorney, Agent, or Firm—Hill, Gross, Simpson, Van Santen, Steadman, Chiara & Simpson

[57] ABSTRACT

An improved integrated magnetic head structure of the type having a plurality of thin metal layers forming a magnetic head winding. These layers are generally symmetrical to a plane of symmetry lying perpendicularly to a gap plane on a non magnetic, insulating substrate, and these layers have flanks which are, with increasing distance from the substrate, shortened by a predetermined length distance. This head structure requires only a few masks to make with a minimum of mask adjustments. Extremely fine structures can be produced.

4 Claims, 7 Drawing Figures

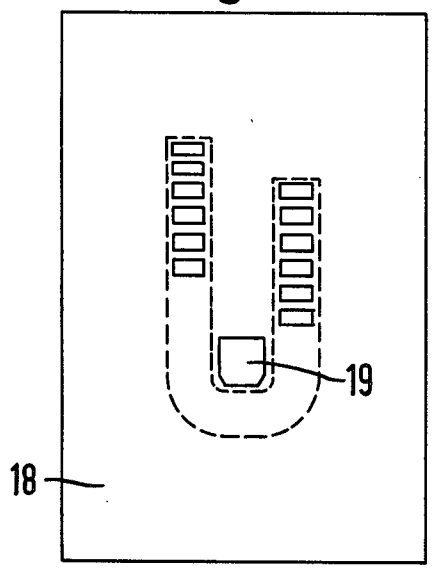
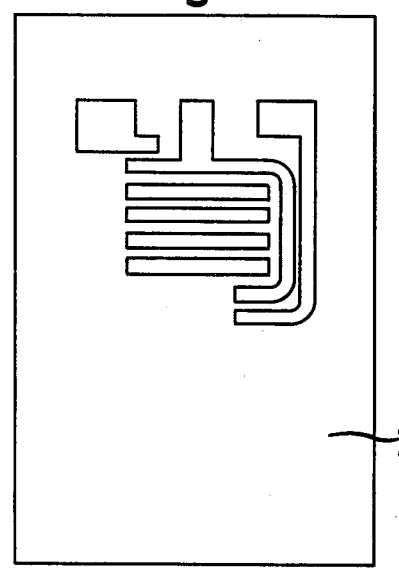
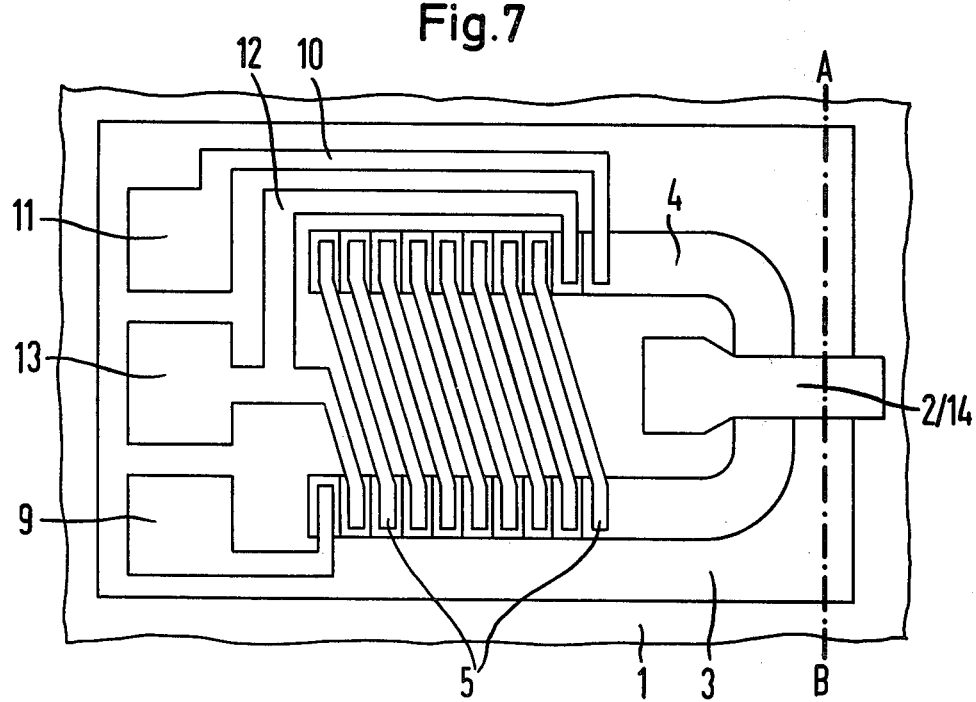

MAGNETIC HEAD AND PROCESS FOR MAKING LAMINATED MAGNETIC HEAD

BACKGROUND OF THE INVENTION

The field of this invention lies in integrated magnetic head structures and in processes for the production thereof.

U.S. Pat. No. 3,846,841 discloses an integrated magnetic head structure having thin magnetic layers for the formation of the magnetic circuit, and having a winding which consists of a plurality of turns in the form of conductive layers arranged one above another, with interposed insulating layers. The head winding is constructed from U-shaped conductor path elements which are identical except for the elements in the lowest and uppermost conductor path layers. Further conductor path elements electrically connect one set of flank ends of the U-shaped elements to the opposed set of flank ends of the U-shaped elements in the next layer.

Thus, although the conductor path elements and the interposed insulating layers are for the main part of identical formation, seven different mask shapes are required in order to produce the conductor parcel by vapor depositing the corresponding materials onto one individual substrate. A further mask shape is required when a central tapping is desired in the head winding. Following the completion of each individual layer, the masks must be changed which necessitates readjustment on each occasion. Furthermore, at the current stage of development of the perforated mask technique, structure widths of below 50 μm can hardly be achieved.

BRIEF SUMMARY OF THE INVENTION

More particularly, this invention is directed to an improved integrated magnetic head structure involving a plurality of thin metal layers which are fundamentally symmetrical to a plane of symmetry which lies perpendicularly to a gap plane on a non-magnetic, electrically insulating substrate. U-shaped conductive layers have flanks which are with increasing distance from the substrate, shortened by a length distance which is sufficient for connection to a further conductive layer.

A primary aim of this invention is to provide a magnetic head structure for integrated circuits and the like which requires only a few masks compared to the prior art.

Another aim is to provide such a structure which requires a minimum number of mask adjustments to make.

Another aim is to provide such a structure which can be produced with extremely small structures.

Another aim is to provide a production process for such a structure which closely reciprocates with the magnetic head structure.

Other and further objects, aims, purposes, features, advantages, embodiments, and the like will be apparent to those skilled in the art from the present specification taken with the accompanying drawings.

BRIEF DESCRIPTION OF THE DRAWINGS

In the drawings:

FIG. 5 is a view similar to FIG. 3, but showing still another such mask;

FIG. 6 is a view similar to FIG. 3, but showing yet another such mask; and

FIG. 7 is a plan view of another embodiment of an integrated magnetic head structure of the present invention.

DETAILED DESCRIPTION

Figure 1:
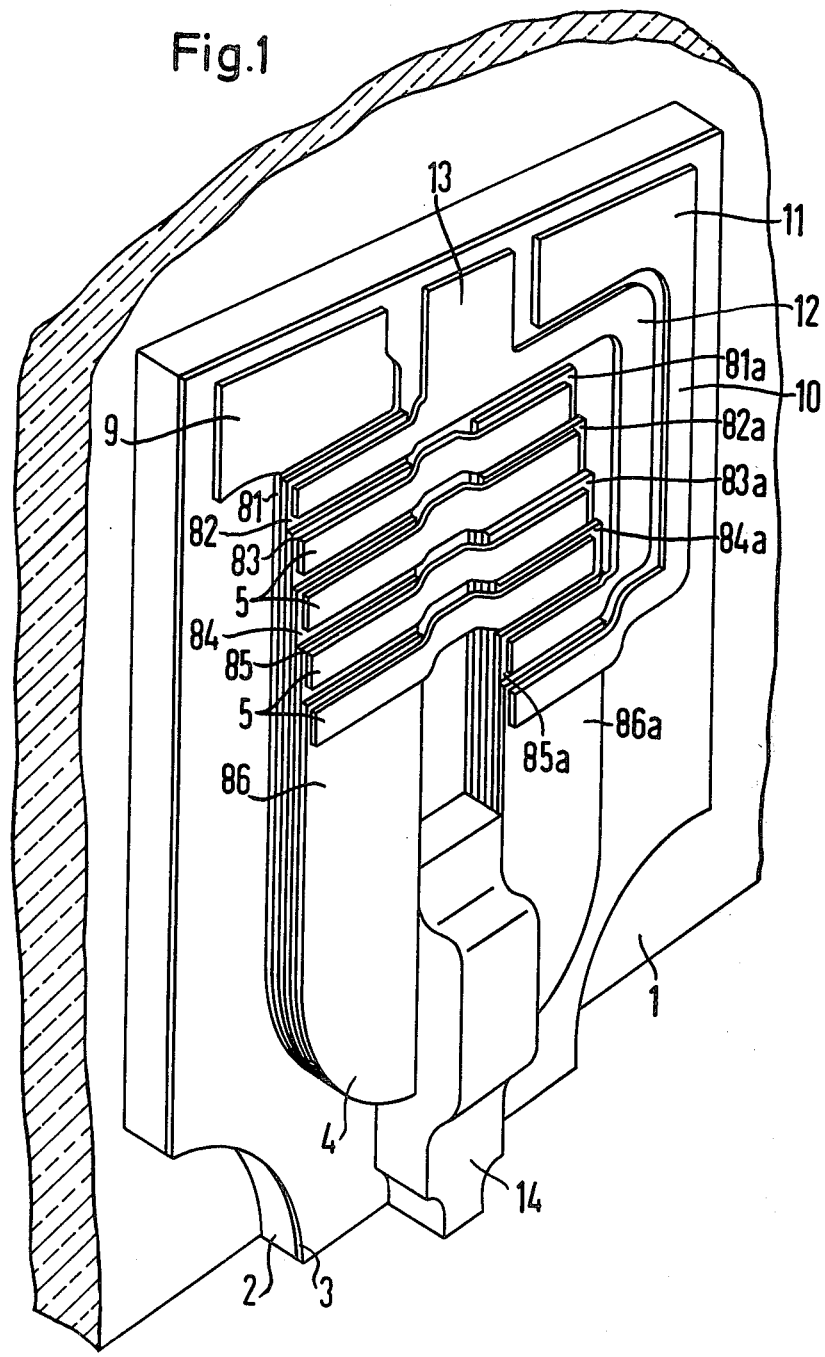
FIG. 1 is a simplified, perspective view of one embodiment of an integrated magnetic head structure of the present invention.

In a basically simplified, perspective view, there is seen in FIG. 1 an embodiment of an integrated magnetic head structure of the present invention. On a substrate 1, of which only one edge is shown (the other edges being broken away), is deposited a first magnetic layer 2. Over layer 2 is deposited an insulating layer 3. The outline or perimeter of the two layers corresponds to the outline or perimeter of the integrated magnetic head structure. The magnetic layer 2 consists, for example, of an iron-nickel alloy, an iron-nickel-chrome alloy, a ferrite, or the like. The insulating layer 3 consists, for example, of silicon oxide, aluminum-oxide, or the like. An insulating layer (not shown in FIG. 1) also covers a major portion of a conductor parcel or stack 4. The conductor parcel 4 serves to form the magnetic head winding. Parcel 4 itself consists of a plurality of U-shaped, thin, conductive layers 8 which are each separated from one another and from the magnetic layer 2 by individual insulating layers 7 (not detailed in FIG. 1). The flank pair, or terminal leg regions pair, of each respective individual, U-shaped, conductive layer becomes shorter, the further layer is positioned relative to the underlying, supporting such individual insulating layer 3 and the substrate 1. The difference D (see FIG. 2) between the flank terminus length of a lower but consecutive U-shaped conductive layer 8 relative to a higher but next adjacent such layers is slightly greater than the width of each of a further or second group of conductive layers 5, as will be explained below.

Figure 2:
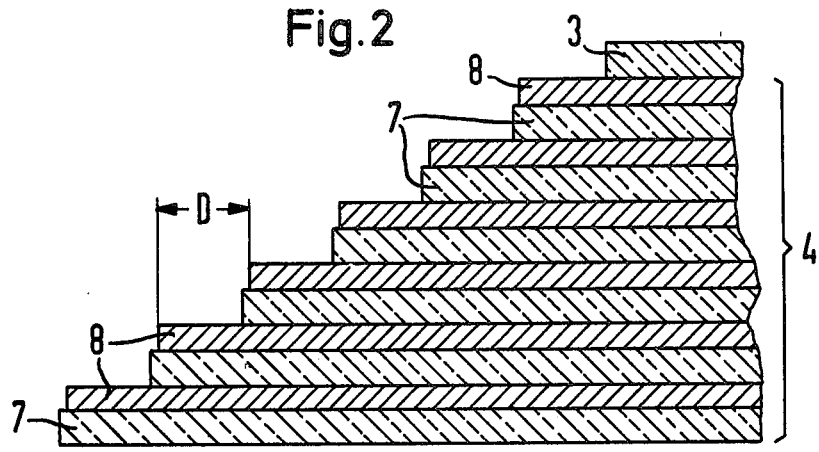
FIG. 2 diagrammatically illustrates a vertical sectional view through the flank ends of the U-shaped, conductive layers employed in the embodiment of FIG. 1 illustrating construction of the conductor parcel in such region.

In addition, difference D exists between the flank terminus length of a lower but consecutive U-shaped conductive layer 8 and the flank terminus of a higher but next adjacent such layer 8. Such a pyramidal staggering by a distance D of the respective adjacent flank ends of the U-shaped, conductive layers 8 is illustrated in FIG. 2. Such successive, adjacent layer pairs 8 are each separated from one another by an insulating layer 7.

For electrical and magnetic interconnection of the layers 8 thus comprising a magnetic head winding, one of the terminal leg region on the first, lowest, U-shaped, conductive layer 81 which has the largest such pair of legs is connected to a first contact spot 9 composed of electrical conductive material. A similar connection between a conductor path 10 and one flank 86a of the terminal leg region of the last highest U-shaped conductive layer 86 which has the shortest such pair of legs is provided by a contact spot 11. In order to produce the desired continuous winding, a plurality of conductive layers 5 are provided. Each layer 5 extends transversely across the region between flanks of individual U-shaped layers 8 joining the terminal leg end of a lower layer 8 with the terminal leg and of an adjacent higher layer 8 across therefrom. Thus, short flank 81a of the first layer 81 is connected by a layer 5 to long flank 83 of the third layer 83, short flank 82a of the second layer 82 is connected by another layer 5 to long flank 84 of the fourth layer 84, short flank 83a of the third layer 83 is connected by another layer 5 to long flank 85 of the fifth layer, and short flank 84a of the fourth layer 84 is connected by another layer 5 to long flank 86 of the sixth layer 86. An additional conductive layer 12 connects the short flank 85a of the fifth layer 85 to the long flank 82 of the second layer 82. The conductive layer 12 also merges into a contact spot 13 which provides a contact for a central tapping of the magnetic head winding. Thus, overall, the following winding course exists: contact spot 9, first, third, fifth U-shaped, conductive layers 8, central tapping 13, second, fourth, sixth U-shaped conductive layers 8, and contact spot 11.

The magnetic circuit is completed by a magnetic layer 14 which extends semicircularly over the base or neck region of the U-shaped conductor parcel 4 which is comprised of layers 7 and 8, as explained. An operative gap is present between the stack of magnetic layers 8 and between the layer structures 2 and 14 and is formed by the insulating layer 3 located between one end of layer 14 and layer 2. At the other end of the magnetic layer 14, the insulating layer 3 is removed prior to the application of the magnetic layer 14 so layer 14 here connects with layer 2.

There are several possible ways of producing the magnetic head structure in accordance with the invention, as those skilled in the art will appreciate. Thus, the entire structure of layers can be produced by sputtering, or by vapor depositing of the appropriate materials with the aid of apertured masks. However, such a procedure is complicated and does not permit the production of extremely fine (thin) structures. In a preferred production process for making a magnetic head structure of this invention, an alteration of sections of process steps employing different techniques is utilized, such as a sputtering of materials employing perforated masks, and a chemical etching employing photo-masks. In such preferred process, the total number of masks required is few, and their adjustment is, for the most part, subject to few requirements. Furthermore, it is possible to achieve structure edges which rise with a flat gradient, which edges are particularly desirable whenever further structures are to be arranged above and over already existing structures.

In a first process step, the magnetic head layer 2 (FIG. 1) is atomized onto substrate 1 with the aid of an appropriately shaped and apertured masks.

Figure 3:
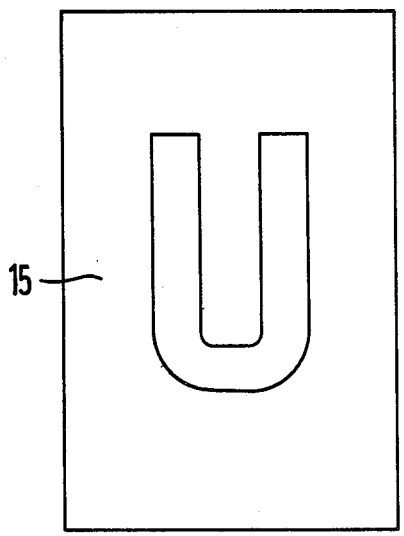
FIG. 3 illustrates a plan view of one mask employed in making the embodiment of FIG. 1.
Figure 4:
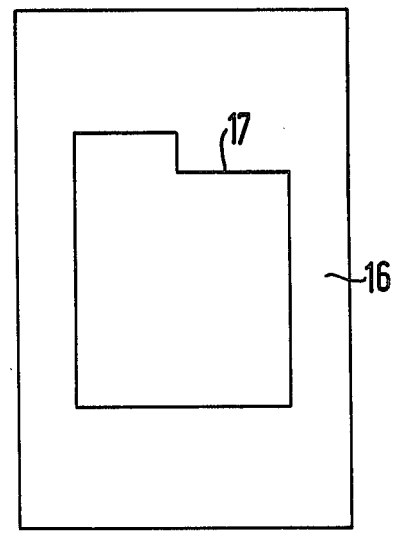
FIG. 4 is a view similar to FIG. 3, but showing another such mask.

In a second process step or section, the parcel 4 is produced. For this purpose, a U-shaped mask 15 such as illustrated in FIG. 3 is employed in association with a sliding mask 16 such as illustrated in FIG. 4. The perforated mask 15 remains at or in the same position until all the layers belonging to the conductor parcel 4 have been sputtered into existence. The desired step-by-step reduction of the flank ends respectively of the U-shaped layers 8 with increasing distance from the substrate 1 is achieved by advancing the governing edge 17 of the sliding mask 16 by the amount D along the direction of the base of each U-shape. With such a rectilinear edge 17, U-shaped layers 8 are formed whose respective two flanks are of substantially equal length. In order to produce unequal flank terminal end portion of each U-shaped layer 8, as illustrated in FIG. 4, the edge 17 is divided into two parallel halves which are displaced from one another by the distance D or 2D, as the case may be. Instead of the mask 15 shown in FIG. 3 which has a U-shaped aperture therein, it is alternatively practical to use a mask having a rectangular aperture therein which at least defines the U-shape. It is even possible to entirely omit the mask 15.

The production of the parcel 4 commences with the establishment of the insulating base layer 7. The first conductive layer 8' is formed in the same position of the sliding mask 16. When the sliding mask 16 has had its edge 17 displaced by the distance D, the next insulating layer 7 and the next conductive layer 8 there-above are formed. This procedure is continued until the uppermost, conductive layer 8 has finally been sputtered into place. This layer possesses the shortest flanks, as explained. In order to safely prevent short-circuits between conductive layers 8 arranged one above another, it is expedient and preferred to displace the edge 17 of sliding mask 16 by a small amount following the production of each insulating layer 7.

When all the layers comprising a given parcel 4 have been applied, there upon such parcel 4 there is produced, in known manner, a photo-mask which covers the parcel 4 in such a way that the latter obtains its final desired form during a subsequent etching process. Here, for example, the originally wider flanks of the conductor parcel 4 are made narrower. Alternatively, the desired U-shape is not in fact produced until, during the preceding sputtering of the layers, as described, the fixed mask 15 has only a rectangular opening therein in order to coarsely determine the outer outlines of the conductor parcel 4, or even mask 15 is entirely omitted. In particular, however, in the case of chemical etching, the edges of the parcel 4 are flattened which is important for a satisfactory formation of layers later formed which later run over these edges.

Next an insulating layer 3 is positioned over the magnetic head structure which has been produced so far. As those skilled in the art will appreciate, because FIG. 1 is a simplified drawing, it does not show that the layer 3 also covers the parcel 4. The production of this insulating layer 3 requires no mask.

In order to electrically connect the respective flank ends of the U-shaped, conductive layers 8 to one another and to the contact spots 9, 11, and 13 in the desired manner, the last insulating layer 7 to have been produced is partially removed again by chemical etching. This is effected with the use of a photo-mask 18 such as is illustrated in FIG. 5. Location and adjustment of the mask 18 must be carried out carefully in respect to the respective flank ends, which are respectively staggered in length, of the U-shaped, conductive layers 8. Such etching partially exposes the ends of the U-shaped conductor paths in the parcel 4. The insulating layer 3 is etched away again at the point 9 at which the magnetic short-circuit 14 touches the initially produced magnetic layer 2. Thereafter, the entire magnetic head structure, at the least, however, the entire region which is later occupied by the additional connection lines, including the contact spots, is covered with an electrically conductive layer. The individual conductor paths are separated from one another in a further etching process employing an appropriately shaped photo-mask. A suitable mask 20 for this purpose is illustrated in FIG. 6.

In a last step for the production of a magnetic head structure, the magnetic short-circuit 14 (FIG. 1) is now produced as a homogeneous, magnetic layer. Here, the insulating layer 3 present between the two layers 2 and 14 forms the operative gap for the magnetic head. By way of protection from damage, the upper side of the magnetic head structure can be coated with a glass layer, with the exception of the contact spots 9, 11 and 13. The magnetic head is completed preferably by polishing and lapping the magnetic head surface.

FIG. 7 illustrates a further exemplary embodiment of an integrated magnetic head structure of the present invention. This embodiment differs from that illustrated in FIG. 1 in several ways. Regardless of these differences, layers and layer structures corresponding to one another have been provided with like reference numerals. The two magnetic pole-pieces 2 and 14, which together form the magnetic core, now possess a common configuration. Therefore, they can be produced using the same mask, the shape of which can readily be seen from FIG. 7.

As has already been disclosed in the publication "IEEE Transactions on Magnetics", Vol. MAG-7, No. 1, March 1971, pages 146–150, in place of a relatively thick, homogeneous, magnetic layer, it is expedient to employ a plurality of correspondingly thin, magnetic layers which are separated by similarly thin insulating layers. The design of the magnetic layers provided in the exemplary embodiment shown in FIG. 7 permits the use of a layer structure of this kind. In such embodiment, the magnetic layers are anisotropic with the easy axis direction being parallel to the later operative gap. Here, changes in magnetization occur as a result of the rotation of the magnetization vector in place of wall displacements.

A further difference between the previously described exemplary embodiment and that of Example 7 lies in the formation of the parcel 4. The flanks in each of the individual, U-shaped, conductive layers 8 are here of equal length. This is achieved by having the sliding mask 16 possess a rectilinear edge 17 (FIG. 4). As a result, the individual conductor portions 5 each connect one flank end of a U-shaped, conductive layer 8 in a winding without central tapping to another chosen flank end opposed of an adjacent U-shaped, conductive layer 8, alternatively, in the case of a winding having a central tapping, the individual conductor portions 5 connect one blank end to another flank end of a different U-shaped, conductive layer 8 removed once so that such portions 5 extend obliquely to the plane of symmetry which lies at right angles to the gap plane. FIG. 7 illustrates the course of these conductor portions 5 and of the other connection lines 11 and 12 in the event that the magnetic head winding is provided with a central tapping.

The production of the magnetic head structure illustrated in FIG. 7 is effected generally in the same manner as that of the magnetic head structure illustrated in FIG. 1. The masks employed for these purposes should be matched accordingly. When the two exemplary embodiments are compared, it is readily seen, how this is accomplished. Following the application of all the layers of the integrated magnetic head structure, the magnetic head surface is produced by grinding away those parts of the structure lying to the right of the dotted line A-B in FIG. 7, including the substrate.

Mixed forms of the two described exemplary embodiments and further modifications thereof are possible without departing from the scope of the present invention as those skilled in the art will appreciate.

Although various minor modifications might be suggested by those versed in the art, it should be understood that we wish to embody within the scope of the patent warranted hereon all such modifications as reasonably and properly come within the scope of our contribution to the art.

We claim:

1. An integrated magnetic head structure comprising
   (A) a substrate,
   (B) a first magnetic layer deposited on a portion of one face of said substrate,
   (C) a first insulating layer deposited over said first magnetic layer, the perimeter of said first magnetic layer and of said first insulating layer corresponding to the perimeter of said integrated magnetic head structure,
   (D) a conductor stack deposited over a central region of said first insulating layer, said conductor stack consisting of
      (1) a plurality of generally U-shaped electrically conductive layers,
      (2) a plurality of generally U-shaped electrically insulating layers, each one of said insulating layers being interposed between an adjacent pair of said conductive layers for insulating such layers from one another,
      (3) each U-shaped conductive layer having a pair of laterally spaced legs interconnected terminally across one adjacent end region by a bridge, all bridges of said conductive layer plurality being vertically generally aligned with one another, all vertically adjacent legs on one side of said stack comprising a first leg set, all vertically adjacent legs on the laterally opposed side of said stack comprising a second leg set,
      (4) the terminal regions of each succeeding pair of legs being shorter than the terminal regions of each preceding pair of legs with increasing vertical distances from said first insulating layer,
      (5) a first electrically conductive pathway forming a first contact spot on said first insulating layer and interconnected with the terminal region of the leg of the conductive layer adjacent said first insulating layer in said first leg set,
      (6) a second electrically conductive pathway forming a second contact spot on said first insulating layer and interconnected with the terminal region of the leg of the uppermost conductive layer relative to said first insulating layer, in said second leg set,
      (7) a plurality of electrically conductive pathways, each such pathway interconnecting the terminal region of a leg in said first leg set with the terminal region of a leg in said second leg set which second set leg is associated with the conductive layer which is vertically adjacent the conductive layer of the first set leg, the first set leg and its associated conductive layer being vertically farther from said first insulating layer than the second set leg and its associated conductive layer,
   (E) a second magnetic layer deposited over said conductor stack in the region of said bridges thereof, an aperture being defined in said first insulating layer adjacent said stack, first magnetic layer said second magnetic layer being interconnected across said aperture means.

2. The intergrated magnetic head structure of claim 1 wherein said terminal regions of each leg in said first leg set are equal to each corresponding leg, of each leg pair, in said second leg set with increasing vertical distances of said conductive layers from said first insulating layer.

3. The intergrated magnetic head structure of claim 1 wherein said terminal regions of each leg in said first leg set are longer than each corresponding leg, of each leg pair, in said second leg set with increasing vertical distances of said conductive layers from said first insulating layer.

4. The integrated magnetic head structure of claim 1 wherein said conductive layer plurality incorporates an even number of such conductive layers, and wherein in addition to said first and said second conductive pathways and to said plurality of conductive pathways, a third electrically conductive pathway is included which forms a third contact spot on said first insulating layer and which interconnects respectively with the terminal region of the leg in said second leg set adjacent the uppermost leg therein, relative to said first insulating layer, and with the terminal region of the leg in said first leg set adjacent the lowermost leg therein, relative to said first insulating layer.

* * * * *